(12) United States Patent
Fitzgerald et al.

(10) Patent No.: US 10,140,150 B2
(45) Date of Patent: Nov. 27, 2018

(54) THREAD DIVERSION AWAITING LOG CALL RETURN

(71) Applicant: Microsoft Technology Licensing, LLC, Redmond, WA (US)

(72) Inventors: Robert Patrick Fitzgerald, Fall City, WA (US); Cristian Diaconu, Kirkland, WA (US); Michael James Zwilling, Bellevue, WA (US); Per-Ake Larson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 272 days.

(21) Appl. No.: 15/018,531

(22) Filed: Feb. 8, 2016

(65) Prior Publication Data

US 2017/0228254 A1  Aug. 10, 2017

(51) Int. Cl.
*G06F 9/46* (2006.01)
*G06F 9/48* (2006.01)

(52) U.S. Cl.
CPC ................... *G06F 9/4843* (2013.01)

(58) Field of Classification Search
CPC .............. G06F 9/4843; G06F 9/485
See application file for complete search history.

(56) References Cited

U.S. PATENT DOCUMENTS

| | | | | |
|---|---|---|---|---|
| 6,119,173 A * | 9/2000 | Pullen | ............... | G06F 9/542 370/410 |
| 6,711,644 B1 * | 3/2004 | Accapadi | ............... | G06F 13/12 710/263 |
| 7,065,537 B2 | 6/2006 | Cha et al. | | |
| 7,249,150 B1 | 7/2007 | Watanabe et al. | | |
| 7,383,290 B2 | 6/2008 | Mehra et al. | | |
| 7,483,911 B2 | 1/2009 | Cherkauer | | |
| 7,509,351 B2 | 3/2009 | Lomet et al. | | |
| 7,730,153 B1 | 6/2010 | Gole et al. | | |
| 8,121,980 B2 | 2/2012 | Reid et al. | | |
| 8,223,845 B1 * | 7/2012 | Duvivier | ............... | H04N 19/80 375/240.24 |
| 8,706,687 B2 | 4/2014 | Fineberg et al. | | |
| 8,856,469 B2 | 10/2014 | Jin et al. | | |

(Continued)

OTHER PUBLICATIONS

International Search Report and the Written Opinion issued in PCT Application No. PCT/US2017/015917 dated Apr. 19, 2017.

(Continued)

*Primary Examiner* — Emerson C Puente
*Assistant Examiner* — Steven M Do
(74) *Attorney, Agent, or Firm* — Workman Nydegger (57) ABSTRACT

The efficient use of threads that issue calls to log events. While waiting for the call to return or complete, the threads are put to work on other tasks that are not part of the process that generated the event. This can occur without context switching of the thread, especially when the task to be performed is state-less or context free. In the efficient thread diversion process, the thread calls a logging component to log an event. This blocks the thread from continuing work on a process that the event is part of until the event is logged. The thread then performs a diversion task that is not part of the processing unit that the event is part of. After detecting that the event has logged, the thread continues work on the processing unit that the event is part of.

18 Claims, 4 Drawing Sheets

(56) References Cited

U.S. PATENT DOCUMENTS

| | | |
|---|---|---|
| 8,898,388 B1 | 11/2014 | Kimmel |
| 2006/0167895 A1 | 7/2006 | Shim |
| 2006/0190943 A1* | 8/2006 | Haeri ................... G06F 9/4887 718/103 |
| 2014/0297595 A1 | 10/2014 | Larson et al. |
| 2015/0143381 A1* | 5/2015 | Chin ....................... G06F 9/485 718/104 |
| 2015/0317595 A1 | 11/2015 | De Niladri et al. |
| 2016/0350214 A1* | 12/2016 | Payer ................ G06F 12/0269 |

OTHER PUBLICATIONS

Herb Sutter: "Go Parallel / Dr. Dobb's/ Use Thread Pools Correctly: Keep Tasks Short and Nonblocking" Apr. 13, 2009. Retrieved from the Internet: http://www.drdobbs.com/go-parallel/article/pring?articleId=216500409.

Wang, et al., "Scalable Logging through Emerging Non-Volatile Memory", In Proceedings of the VLDB Endowment, vol. 7, No. 10, Sep. 1, 2014, pp. 865-876.

Debrabant, et al., "A Prolegomenon on OLTP Database Systems for Non-Volatile Memory", In Proceedings of the VLDB Endowment, vol. 7, No. 14, Sep. 2014, 7 pages.

Huang, et al., "NVRAMaware Logging in Transaction Systems", In Proceedings of the VLDB Endowment, vol. 8, No. 4, Aug. 31, 2015, pp. 389-400.

\* cited by examiner

THREAD DIVERSION AWAITING LOG CALL RETURN

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data.

A computing system is now capable of running hundreds of programs. For instance, a process is an example of a program. Nevertheless, processing capability remains fixed on a computing system. In order to allow for orderly processing of the various programs running on a computing system, a scheduler allocates time for each program. However, the smallest set of instructions that is seen by a scheduler is often referred to as a "thread". Threads are often implemented within the context of a larger processing unit, such as a process, component, or program.

When a processing unit generates an event that is to be logged by a thread, the thread calls a logging component. Conventionally, logging an event can take quite a long time in relative computing terms—perhaps in the millisecond and hundreds of microseconds range. During this time, the thread has conventionally either been left idle, or placed in sleep mode so as to consume fewer computing resources. Either way, the thread that called into the logging component often cannot resume performing for the processing unit until the call is returned.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the efficient use of threads that issue calls to logging components to log events. Rather than have the threads sit idle while waiting a determination that the event has been logged (e.g., via a call return in a synchronous embodiment, or via polling in an asynchronous embodiment), those threads are put to work on other tasks that are not part of the processing unit that generated the event. This can occur without context switching of the thread, especially when the task to be performed is state-less or context free. The use of threads made be efficient even if the latency between the call time and return time for the event log call is short.

In the efficient thread diversion process, the thread calls a logging component to log an event. This blocks the thread from continuing work for a processing unit that the event is part of until a determination can be made that the event has been logged. After placing the call, the thread automatically performs one or more tasks that are not part of the processing unit that the event is part of. This efficiently uses the thread while awaiting the determination that the event has been logged. After determining that the event has been logged, the thread continues work for the processing unit in which the event occurred. This may be repeated multiple times for each thread, and for multiple threads, providing substantial improvement in the capability to perform background tasks, particularly for those tasks that are pausable and resumable and/or that take about as much or less processing time as the latency between the call and the completion of the logging.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to the efficient use of threads that issue calls to logging components to log events. Rather than have the threads sit idle while waiting a determination that the event has been logged (e.g., via a call return in a synchronous embodiment, or via polling in an asynchronous embodiment), those threads are put to work on other tasks that are not part of the processing unit that generated the event. This can occur without context switching of the thread, especially when the task to be performed is state-less or context free. The use of threads made be efficient even if the latency between the call time and return time for the event log call is short.

In the efficient thread diversion process, the thread calls a logging component to log an event. This blocks the thread from continuing work for a processing unit that the event is part of until a determination is made that the event has been logged. After placing the call, the thread automatically performs one or more tasks that are not part of the processing unit that the event is part of. This efficiently uses the thread while awaiting the determination that the event has been logged. After determining that the even has been logged, the thread continues work for the processing unit in which the event occurred. This may be repeated multiple times for each thread, and for multiple threads, providing substantial improvement in the capability to perform background tasks, particularly for those tasks that are pausable and resumable and/or that take about as much or less processing time as the latency between the call and the completion of the logging.

Some introductory discussion of a computing system will be described with respect to FIG. 1. Then, the efficient diversion of threads to perform diversion tasks while awaiting completion of the logging will be described with respect to FIGS. 2 through 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
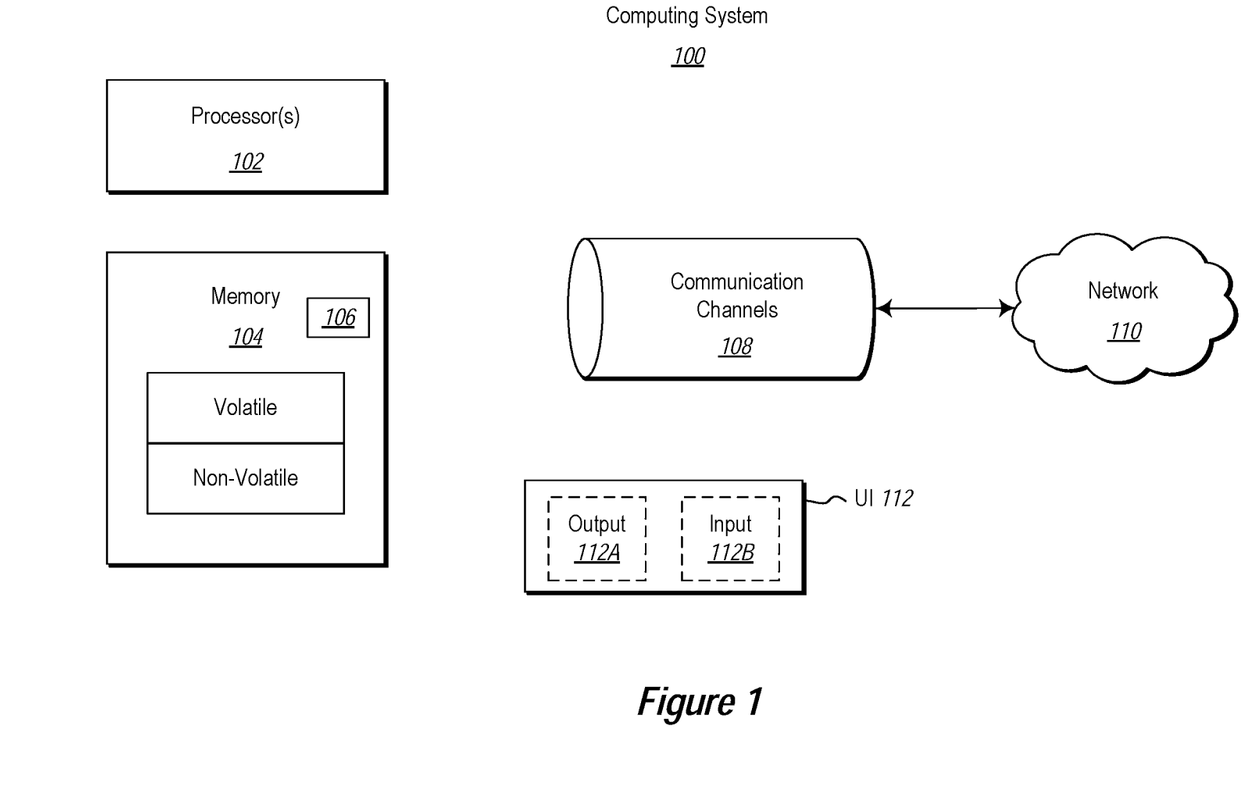
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
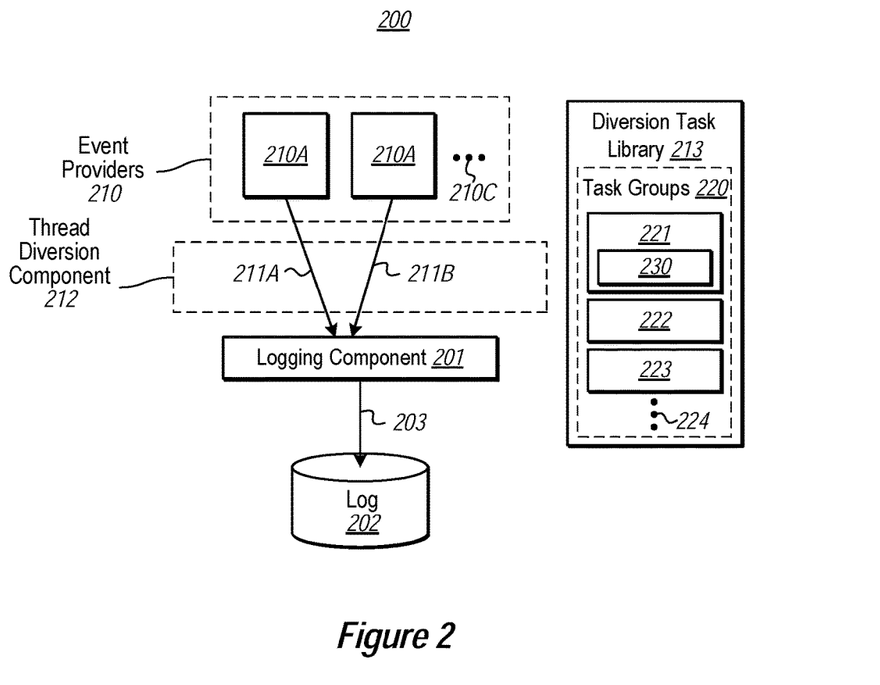
FIG. 2 illustrates a system in accordance with the principles described herein, in which event providers write events to a logging component by having their thread make an event log call into the logging component, and in which a diversion task component puts the thread to work performing a diversion task while awaiting a determination that the event has been logged such as via a log call to return.

FIG. 2 illustrates a system 200 in accordance with the principles described herein. The system 200 includes a logging component 201, which may be structured as described above for the executable component 106 of FIG. 1. Furthermore, the system 200 may be structured as described above for the computing system 100 of FIG. 1. The logging component 201 causes events to be written to a log 202 as represented by arrow 203. The log 202 may represent any medium for logging of events. As examples only, the log 202 may be a local or remote Hard Disk Drive, Solid State Disk, or combination thereof, or a disk array comprising the same. Alternatively or in addition, the log 202 may be memory, including system memory, and may be non-volatile or volatile. Alternatively or in addition, the log 202 may also be present on multiple targets, such as a primary computing system, and a secondary computing system. Alternatively or in addition, the log 202 may be located on a single machine, or may be distributed, as for example, in a cloud computing environment.

The system 200 includes a set 210 of event providers that provides events to the logging component 201 for logging. Specifically, the event providers have threads that make calls (also called hereinafter "event log calls") into the logging component 201 in order to log events. For instance, in an example, event provider 210A first provides an event (called hereinafter "event A") as represented by arrow 211A. Event provider 210B then provides an event (called hereinafter "event B") as represented by arrow 211B. The event providers 210 are illustrated as including two event providers 210A and 210B. However, the principles describe herein are independent of how many event providers are providing events into the log. Accordingly, the ellipses 210C are provided to symbolize flexibility in the number of event providers providing events to be logged. Event providers may be any software or hardware component or system, whether locally resident on the system 200 or whether remotely located.

Figure 3:
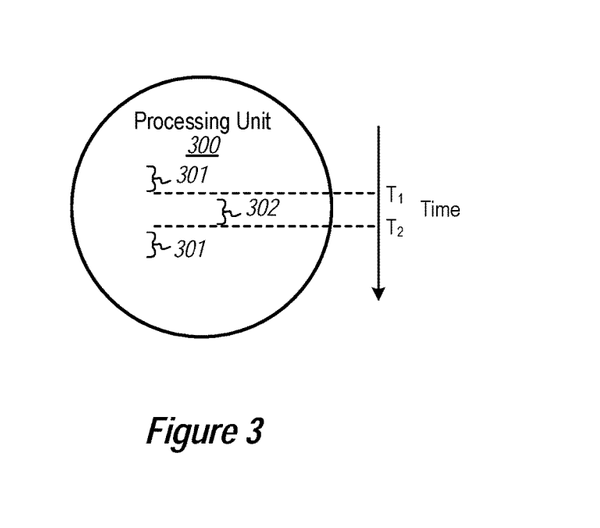
FIG. 3 symbolically illustrates a processing unit that operates two threads, switching between the threads as time progresses.

FIG. 3 illustrates a processing unit 300 that operates one or more threads. A processing unit is any unit of processing in which threads are associated or contained, and which changes contexts when switching from one thread to another. An example in some operating systems is a process, program or component. For instance, the processing unit 300 is illustrated as including two threads, thread 301 and thread 302. At time T1, the processing unit 300 unit switches from operating thread 301 to operating thread 302. At time T2, the processing unit 300 switches from operating thread 302 to operating thread 301. Each time the operating thread changes, there is a context switch that occupies some computing resources.

In any case, when a thread makes an I/O call, such as an event log call, to a logging component, the thread often cannot continue working on work within the thread's associated processing unit until it is determined that the I/O has been completed (e.g., via a call return in a synchronous embodiment, or via polling in an asynchronous embodiment). Otherwise, there is risk of inconsistent state of resources (such as shared memory) used by the processing unit. If it will be a long time before the work is completed, then perhaps the thread may be put in sleep mode so as to preserve computing resources. For instance, the thread (of event provider 210A) that calls the logging component 201 to request event A be logged will not operate in the context of its processing unit of the event provider 210A until the work induced by the call is completed. Also, the thread (of event provider 210B) that calls the logging component 201 to request event B be logged will not operate in the context of its processing unit of event provider 210B again until the work induced by the call is completed.

Returning to FIG. 2, the system 200 also includes a thread diversion component 212 that causes threads to automatically perform tasks (hereinafter also called "diversion tasks") that are not part of the processing unit after the thread has called the logging component to log the event, whilst the thread is awaiting the call return. After detecting the call has returned, the system 200 permits the thread to continuing work for the processing unit that generated the event. Accordingly, the thread diversion component 212 puts idle threads to work on diversion tasks while they await instructions to return on their normal work, thereby efficiently using the threads and computer resources.

The system 200 also includes a diversion task library 213 that includes multiple tasks that may be completed by threads that await call work to complete. The diversion tasks may be organized into groups of common processing time ranges. For instance, diversion tasks that are anticipated to be processable within a certain time range are grouped into one group. While there may be but a single group, in FIG. 2, there are three groups 220 shown including group 221, 222 and 223. The ellipses 224 represent flexibility in the number of groups 220. Furthermore, within each group, there may be any number of diversion tasks, which are not shown in FIG. 2 except for one diversion task 230 within group 221. A group may even perhaps be empty in some cases. However, there may be from as little as one to an enumerable number of diversion tasks within each group, each group organized by expected processing time ranges.

In some embodiments, the diversion tasks may be context-free or stateless diversion tasks. This allows the thread to work on the diversion task regardless of what state the thread presently has as none of the state will affect or be affected by the performance of the diversion task. Thus, when the thread resumes the normal work of the processing unit, it is as though the thread had always been waiting with no change in the state expected by normal processing. Furthermore, the diversion task may be performed with no switching of state of the thread, thereby reducing the cost of performing the diversion. One example of a task that is context-free, and that often may be processed in a predetermined time range is a garbage collection task.

In one embodiment, the task may also be pausable and resumable. Accordingly, if the event log call returns whilst the thread is still working on the diversion task, the thread may pause work on the diversion task, and return to the normal work of the processing unit. When the thread or another thread again makes an event log call, the same diversion task may be resumed by that thread that made the newer event log call. To facilitate such pausing and resuming, diversion task itself may keep state sufficient that the diversion task may be paused, and later resumed.

Figure 4:
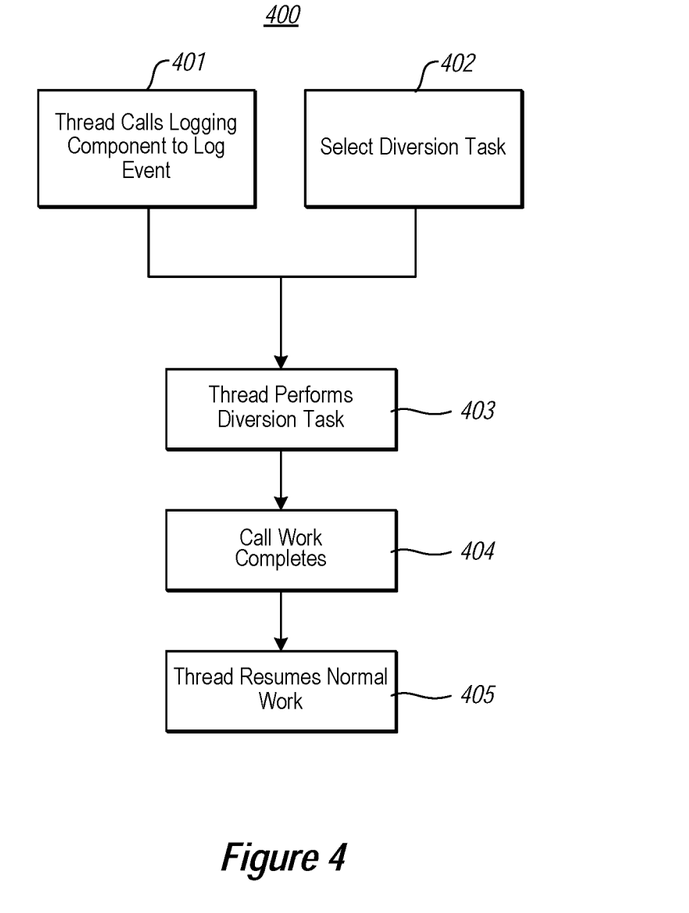
FIG. 4 illustrates a flowchart of a method for logging events of a computing system while allowing threads to be diverted whilst awaiting the determination that the event has been logged.

FIG. 4 illustrates a flowchart of a method 400 for logging events of a computing system while allowing threads to be diverted whilst awaiting event log call work to complete. The method 400 may be performed within the context of the system 200 of FIG. 2. Accordingly, the method 400 will now be described with frequent reference to the system 200 of FIG. 2. The method 400 may be performed each time a thread calls the logging component 200 to perform an event write. For instance, the method 400 would be performed, referring to FIG. 2, when the event A is written, and also again when event B is written.

The method 400 includes a thread calling a logging component to log an event (act 401). For instance, suppose that the processing unit 300 of FIG. 3 is processing event writer 210A, the thread 301 may call the logging component 201 (see FIG. 2) to write event A. From that time until the call work completes (e.g., the call returns), the thread 301 cannot continue working in the processing unit 300. In other words, the thread is blocked from continuing work on the processing unit 300 that the event is part of until the call work is completed. The presence of the event log call may trigger the thread diversion component 211 into operation.

Figure 5:
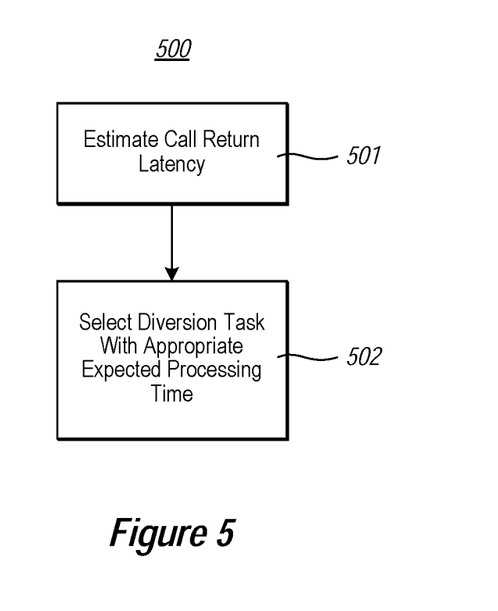
FIG. 5 illustrates a flowchart of a method for selecting a diversion task in accordance with the principles described herein.
Figure 6:
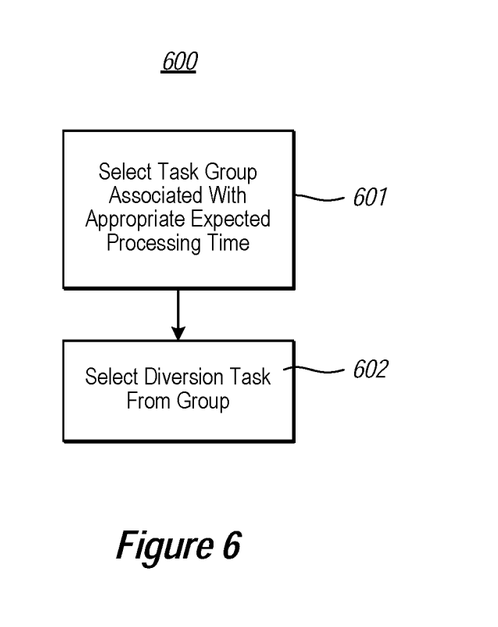
FIG. 6 illustrates a flowchart of a method for selecting diversion tasks from amongst groups of diversion tasks that are organized according to expected processing time.

A set of one or more diversion tasks is also selected for the thread to perform whilst awaiting the event log call to return (act 402). The principles described herein are not limited to when this selection is made, or what component makes the selection. The selection may be made well in advance of the event log call, but may be made in response to the event log call work is completed, or anytime inbetween. Accordingly, to represent this temporal independence between the event log call and the diversion task selection in the broadest context, acts 401 and 402 are shown in parallel in FIG. 4. FIGS. 5 and 6 illustrate various possible mechanisms for making the selection of the diversion tasks. However, before describing those mechanisms, the description of FIG. 4 will be completed.

After the thread calls the logging component to log the event, the thread automatically performs the selected diversion tasks (act 403). For instance, in FIG. 2, the thread diversion component 212 may select diversion task 230 for a thread to perform (e.g., for a thread that performed the event log call represented by event A). If there are more than one diversion tasks selected, then perhaps between performing diversion tasks, the thread diversion component may verify whether the event log call has returned (in the synchronous embodiment), or poll the logging component (in the asynchronous embodiment) to determine whether the logging has completed. Accordingly, the thread may perform the selected diversion task 230. Thereafter, the it is determined that the event has been logged (act 404), resulting in the thread continuing work on the processing unit that the event was part of—in other words, resuming its normal work for the processing unit. Again, determining that the event has been logged may be synchronous (as when a call returns) or asynchronous (in which case, the diversion component learns of the completion via polling of the logging component).

In one embodiment, the selection of the diversion task is designed to allow the diversion task to be completed around the time or prior to the event log call return. However, is some embodiments, to efficiently use resources, the diversion task that is in process (at the time the determination of completion of the event log) is allowed to complete. FIGS. 5 and 6 illustrate a flowchart of methods 500 and 600 for selecting the diversion task in this context. In accordance with FIG. 5, the selection processing estimates an expected latency (act 501) between the time of the event log call and the event log call return. The amount of latency will depend on the system. However, in accordance with the principles described herein, this latency may be very short—perhaps 50 microseconds or less, or perhaps 25 microseconds or less.

Then, the diversion task is selected (act 502) from a task or group of tasks that have a predictable processing time range that approximately the same or less than the estimated expected latency between the time of the call and the time of the call return. If, for instance, the latency was expected to be 30 microseconds, then a group of diversion tasks that have an expected processing time that would allow completion in around 30 microseconds or less may be selected.

FIG. 6 illustrates a method 600 for selecting a diversion task that has a predictable time range and represents an example of act 502 in the context of their being tasks that are grouped by expected processing time range. For instance, in FIG. 2, the diversion task groups 220 are grouped into groups 221, 222 and 223, each having therein diversion tasks of a different expected processing time range. According to method 600, the selection first selects a group of tasks (act 601) such that the collective expected processing time range of tasks selected from the selected group can be made equal to or less than the estimated expected latency between the time of the call and the time of the call return. For instance, in FIG. 2, the group 221 may be selected. The selection then selects one or more diversion tasks from within the selected group (act 602). For instance, the selection could choose task 230 from group 221.

Alternatively or in addition, the diversion tasks may be pausable and resumable task. In that case, perhaps the diversion task could be chosen with less regard for whether or not the diversion task could be processed within the expected latency period between the call and its return. After all, if the diversion task cannot be completed in time to continue immediately after the event log call returns, the diversion task can be paused. For instance, before the thread continues work on the processing unit that the event is part of (act 405), the thread could pause the diversion task for later resumption by the same thread or a different thread. Prior to pausing, the thread may await the call return (act 404). Alternatively or in addition, the diversion task may be performed for a predetermined time period or/and until another condition is satisfied, without regard for whether the call returned or not. In this case, when selecting a diversion task, a thread will also have paused diversion tasks from which it may choose. If a paused task is selected (in act 402), then the paused task is resumed.

Accordingly, the principles described herein provide a mechanism for efficiently using threads in at least some the period between the time the thread makes the event log call and the time the logging is determined to be completed. Normally, the thread may simple stand idle, or be put in sleep mode. However, using the principles described herein, the thread is efficiently used for diversion tasks. Such diversion tasks may be stateless tasks that may be performed aside from normal processing. An example of such background tasks involves garbage collection. Because this process may be repeated multiple times for any given thread, and because this process may be performed for many threads, this can significant improve the efficiency of the computing system, and its capability to complete background tasks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   one or more processors; and
   one or more computer-readable storage media having stored thereon computer-executable instructions that are executable by the one or more processors of the system to perform one or more tasks while waiting for an event to be logged, the computer-executable instructions including instructions to perform the following:
   execute, at the one or more processors, a plurality of threads including a particular thread, each of the plurality of threads alternately executing at the one or more processors;
   during an execution time period allocated to the particular thread, call, from the particular thread, a logging component to log an event;
   after calling the logging component to log the event, block the particular thread from continuing work on a first task of which the event is part until the event has been determined to be logged;
   after blocking the particular thread from continuing work on the first task, determine that there is time left in the execution time period allocated to the particular thread; and
   based on there being time left in the execution time period, automatically perform, by the particular thread, one or more second tasks that are context-free or stateless, and that are independent of the first task of which the event is part;
   determine that the event has been logged; and
   after determining that the event has been logged, continue work, by the particular thread, on the first task of which the event is part.

2. The system in accordance with claim 1, wherein the one or more second tasks are selected from a diversion task library that includes a plurality of tasks that may be completed by threads that await a determination that the logging component has completed the logging of the event corresponding to the call.

3. The system in accordance with claim 2, the diversion task library comprising a plurality of groups of tasks, each of the groups of tasks corresponding to an expected processing time range.

4. The system in accordance with claim 3, wherein the one or more second tasks are selected from one of the plurality of groups of tasks having an expected processing time range that is approximately equal to or less than an estimated expected latency between a time of the call and a time of the determination that the event has been logged.

5. The system in accordance with claim 1, the one or more second tasks including a garbage collection task.

6. The system in accordance with claim 1, the event being determined to be logged by the call to the logging component being returned.

7. The system in accordance with claim 1, the event being determined to be logged by polling the logging component.

8. A method, implemented at a computer system that includes one or more processors, for performing one or more tasks while waiting for an event to be logged, the method comprising:

executing, at the one or more processors, a plurality of threads including a particular thread, each of the plurality of threads alternately executing at the one or more processors;

during an execution time period allocated to the particular thread, calling, from the particular thread, a logging component to log an event;

after calling the logging component to log the event, blocking the particular thread from continuing work on a first task of which the event is part until the event has been determined to be logged;

after blocking the particular thread from continuing work on the first task, determining that there is time left in the execution time period allocated to the particular thread; and based on there being time left in the execution time period, automatically performing, by the particular thread, one or more second tasks that are context-free or stateless, and that are independent of the processing unit of which the event is part;

determining that the event has been logged; and after determining that the event has been logged, continuing work, by the particular thread, on the first task of which the event is part.

9. The method in accordance with claim 8, at least one of the one or more second tasks being pausable and resumable.

10. The method in accordance with claim 8, the method further comprising:

selecting the one or more second tasks from a plurality of tasks that collectively have a predictable processing time range.

11. The method in accordance with claim 10, the predictable processing time range being equal to or less than an expected latency between a time of the call and a time of the determination that the event has been logged.

12. The method in accordance with claim 8, the method further comprising:

estimating an expected latency between a time of the call and a time of the determination that the event has been logged; and selecting the one or more second tasks from a plurality of tasks that have a collective predictable processing time range that is equal to or less than the estimated expected latency between the time of the call and the time of the determination that the event has been logged.

13. The method in accordance with claim 12, the expected latency between the time of the call and the time of the call return being 50 microseconds or less.

14. The method in accordance with claim 12, the expected latency between the time of the call and the time of the call return being 25 microseconds or less.

15. The method in accordance with claim 8 further comprising the following before determining that the event has been logged:

completing, by the particular thread, the one or more second tasks that are independent of the first task of which the event is part.

16. The method in accordance with claim 8, further comprising the following before continuing work on the processing unit of which the event is part:

pausing, by the particular thread, at least one of the one or more second tasks that are independent of the first task of which the event is part.

17. The method in accordance with claim 8, automatically performing the one or more second tasks comprising:

resuming a previously paused task that is independent of the first task of which the event is part.

18. A computer program product comprising one or more computer-readable storage media having thereon computer-executable instructions that are executable by one or more processors of a computing system to perform one or more tasks while waiting for an event to be logged, the computer-executable instructions further including instructions to configure the computing system to perform at least the following:

execute, at the one or more processors, a plurality of threads including a particular thread, each of the plurality of threads alternately executing at the one or more processors;

during an execution time period allocated to the particular thread, call, from the particular thread, a logging component to log an event;

after calling the logging component to log the event, block the particular thread from continuing work on a first task of which the event is part until the event has been determined to be logged;

after blocking the particular thread from continuing work on the first task, determine that there is time left in the execution time period allocated to the particular thread; and based on there being time left in the execution time period, automatically perform, by the particular thread, one or more second tasks that are context-free or stateless, and that are independent of the first task of which the event is part;

determine that the event has been logged; and after determining that the event has been logged, continue work, by the particular thread, on the first task of which the event is part.

* * * * *